E. Morgan,
Churn.

No. 97,674. Patented Dec. 7, 1869.

Witnesses
J. Schmann
C. L. Evert

Inventor
E. Morgan
per
Alexander Mason
Atty

E. Morgan,
Churn.
No. 97,674. Patented Dec. 7, 1869.

United States Patent Office.

EZRA MORGAN, OF FRENCH CREEK, NEW YORK.

Letters Patent No. 97,674, dated December 7, 1869.

IMPROVEMENT IN CHURNS.

The Schedule referred to in these Letters Patent and making part of the same.

*To all whom it may concern:*

Be it known that I, EZRA MORGAN, of French Creek, in the county of Chautauqua, and in the State of New York, have invented certain new and useful Improvements in Churns; and do hereby declare that the following is a full, clear, and exact description thereof, reference being had to the accompanying drawings, and to the letters of reference marked thereon, making a part of this specification.

The nature of my invention consists in tne construction of a device to be attached to the lid of churns, for the purpose of saving any cream that might accidentally splash up on top of the lid.

In order to enable others skilled in the art to which my invention appertains, to make and use the same, I will now proceed to describe its construction and operation, referring to the annexed drawings, in which—

A represents the lid of a churn, through the centre of which is an opening.

Through this opening is placed the cream-saver B, the part above the lid being cup-shaped, with inclined sides within, and having a hole through its bottom, through which the churn-dasher rod passes up and down.

The part of the saver B below the lid is square, and held by a band, C, firmly to the lid.

Figure 1:
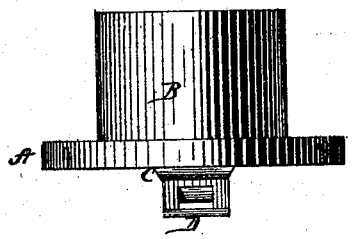
Figure 1 is a side view.
Figure 2:
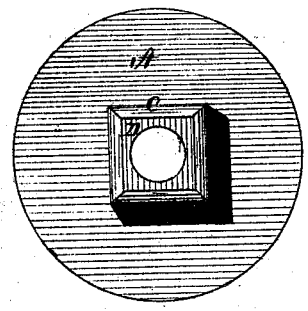
Figure 2 is a bottom view of my invention.
Figure 3:
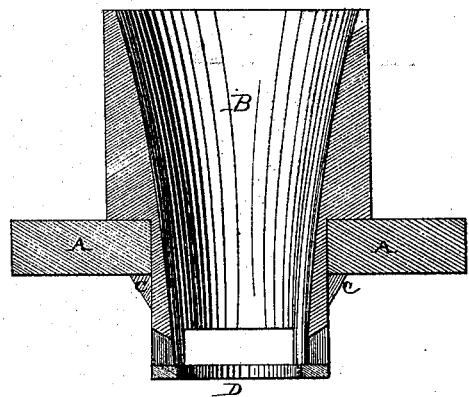
Figure 3 represents a longitudinal vertical section.

The sides of its lower end are cut out, as seen in fig. 1, and at the bottom is secured a metal frame, D, which, when worn out, can be readily replaced by another at very little expense.

Any cream that may be carried upward and splash out above the lid is caught in the saver B, and will readily pass back into the churn again.

I am aware that a conical-shaped metal cream-saver is not new; hence I do not broadly claim such to be my invention.

Having thus fully described my invention,

What I claim as new, and desire to secure by Letters Patent, is—

The flaring cream-saver B, herein described, having a square end, which extends below the churn-lid A, with openings in its side, and provided with the rectangular metal plate D, when connected to lid A by means of the band C, and the shoulder formed in the cream-saver, all as shown and described.

In testimony that I claim the foregoing, I have hereunto set my hand, this 28th day of July, 1869.

EZRA MORGAN.

Witnesses:
C. L. EVERT,
O. D. HINCKLEY.